United States Patent [19]
Smith et al.

[11] Patent Number: 5,904,984
[45] Date of Patent: May 18, 1999

[54] ELECTRICAL INSULATION USING LIQUID CRYSTAL THERMOSET EPOXY RESINS

[75] Inventors: James D. B. Smith, Monroeville; Karl F. Schoch, Jr., Pittsburgh; Wei-Fang A. Su, Murrysville, all of Pa.

[73] Assignee: Siemens Westinghouse Power Corporation, Orlando, Fla.

[21] Appl. No.: 08/734,375

[22] Filed: Oct. 17, 1996

[51] Int. Cl.$^6$ ......................................... D02G 3/00
[52] U.S. Cl. .................... 428/396; 252/299.01; 428/417; 578/87
[58] Field of Search ..................... 252/299.01; 428/396, 428/417; 578/87

[56] References Cited

U.S. PATENT DOCUMENTS

| | | | |
|---|---|---|---|
| 3,998,983 | 12/1976 | Smith | 427/374.1 |
| 4,204,181 | 5/1980 | Smith et al. | 336/96 |
| 4,254,351 | 3/1981 | Smith et al. | 310/45 |
| 4,440,945 | 4/1984 | Conciatori et al. | 560/86 |
| 4,654,412 | 3/1987 | Calundann et al. | 528/176 |
| 5,024,785 | 6/1991 | Hefner, Jr. et al. | 252/299.01 |
| 5,216,073 | 6/1993 | Haider et al. | 525/66 |
| 5,319,005 | 6/1994 | Hagiwara et al. | 523/435 |

FOREIGN PATENT DOCUMENTS

| | | |
|---|---|---|
| 0445401 | 9/1991 | European Pat. Off. . |
| 0475023 | 3/1992 | European Pat. Off. . |
| 9507308 | 3/1995 | WIPO . |

OTHER PUBLICATIONS

"Liquid Crystal Epoxy", High Tech Materials Alert, vol. 8, No. 4, Apr. 1, 1991, p. 4.

Ando, M. and Uryu, "Synthesis of Polymer Materials by Low Energy Electron Beam. XIII. Structure and Properties of EB–Cured Polymers of Bifunctional Monomer with Biphenyl Moiety as Mesogenic Group", *J. of Polymer Science: Polymer Chem.* 1990, 28, 2575–2584.

Barclay, G.G. et al., "Rigid–Rod Thermosets Based on 1,3,5–Triazine–Linked Aromatic Ester Segments", *Macromolecules* 1992, 25, 29497–2954.

Barclay, G.G. et al,. "Liquid Crystalline Epoxy Thermosets Based on Dihydroxymethylstilbene: Synthesis and Characterization", *J. of Polymer Sci. Part A: Polymer Chem.* 1992, 30, 1831–1843.

Broer, D. et al., "In–Situ Photopolymerization of an Oriented Liquid–Crystalline Acrylate", *Makromol. Chem.* 1988, 189, 185–194.

Hoyt, A. and Benicewicz, "Rigid Rod Molecules as Liquid Crystal Thermosets. I. Rigid Rod Amides", *J. of Polymer Science: Part A: Polymer Chem.* 1990, 28, 3403–3415.

Hoyt. A. and Benicewicz, "Rigid Rod Molecules as Liquid Crystal Thermosets. II. Rigid Rod Esters", *J. of Polymer Science: Part A: Polymer Chem.* 1990, 28, 3417–3427.

Su, W.–F., "Thermoplastic and Thermoset Main Chain Liquid Crystal Polymers Prepared from Biphenyl Mesogen", *J. of Polymer Science* 1993, 31, 3251–3256.

G. G. Barclay et al. (1992) *J. Polym Sci: Part A*, 30, 1845–1853.

*Primary Examiner*—Bernard Lipman

[57] ABSTRACT

Liquid crystal thermoset epoxy resin is used as an electrical insulator on electrical conducting devices such as coils and transformers. The linear epoxy/mesogen/epoxy molecule of the liquid crystal thermoset epoxy resin results in a electrical insulator with a high degree of crystallinity. This results in an electrical insulator with mechanical and electrical properties suitable for use in high temperature, high stress environments.

8 Claims, 1 Drawing Sheet

ELECTRICAL INSULATION USING LIQUID CRYSTAL THERMOSET EPOXY RESINS

FIELD OF THE INVENTION

This invention relates generally to the field of electrical insulation. More specifically, it relates to the use of epoxy resins for electrical insulation.

DESCRIPTION OF THE PRIOR ART

Epoxy resins are used extensively as electrical insulators due to their rare combination of toughness, flexibility, adhesion, chemical resistance and electrical properties. They have also been used extensively as surface coating materials and in glass fiber-reinforced articles to provide better mechanical strength, chemical resistance, and electrical insulating properties than those obtained with unsaturated polyesters. However, epoxy resins have reached their useful limit in mechanical and electrical terms.

Liquid crystal polymers have been used to enhance the mechanical properties of epoxy resins. While a large number of liquid crystal polymers have been developed as thermoplastics, relatively few liquid crystal thermoset epoxy resins [LCTs] have been produced.

LCTs' main chain polymers have been produced from appropriate polymers or monomers containing crosslinkable functionalities. The crosslinking functionalities give the LCT polymers their enhanced properties over nonlinked polymers. The prior art consists of various liquid crystal monomers made from different functionalities for crosslinking. Broer et al., in *Makromol. Chem.* 189, 185–194(1988), and Ando and Uryu, in *J. Polym. Sci.*, Part A: Polym. Chem. 28, 2575– 2584(1990), disclosed liquid crystal monomers with acrylate functionalities. Coniatori et al., in U.S. Pat. No. 4,440,945, taught the production of liquid crystal monomers using acetylenic functionalities. Maleimide functionalities have also been used to make liquid crystal monomers, as shown by Hoyt and Benicewicz, in *J. Polym. Sci.*, Part A: Polym. Chem. 28, 3403–3415, 3417–3427(1990). Barclay et al., in *Macromolecules* 25, 2947–2954(1992), disclosed liquid crystal monomers production using cyanate as functionalities. Calundann et al., in U.S. Pat. No. 4,654,412, synthesized liquid crystal polyesters using functionalities such as stilbene and tolane. Hefner and Hayes, in U.S. Pat. No. 5,024,785, discussed the preparation of liquid crystal polymers using epoxy resins and vinyl ester resins containing mesogenic or rigid rodlike moieties. All of the aforementioned references are incorporated herein by reference in their entireties.

W-F.A. Su, in *J. Polym. Sci.*, Part A: Polym. Chem. 31, 3251–56(1993), authored by a co-inventor herein, is also incorporated herein by reference in its entirety.

SUMMARY OF THE INVENTION

Accordingly, it is an object of the invention to provide liquid crystal thermoset epoxy resins for use as electrical insulation.

It is a further object of the invention to provide an electrical conducting device in which electrical insulation is provided by a liquid crystal thermoset epoxy which at least partially covers a surface of the device.

DETAILED DESCRIPTION OF THE PREFERRED EMBODIMENT

Figure 1:
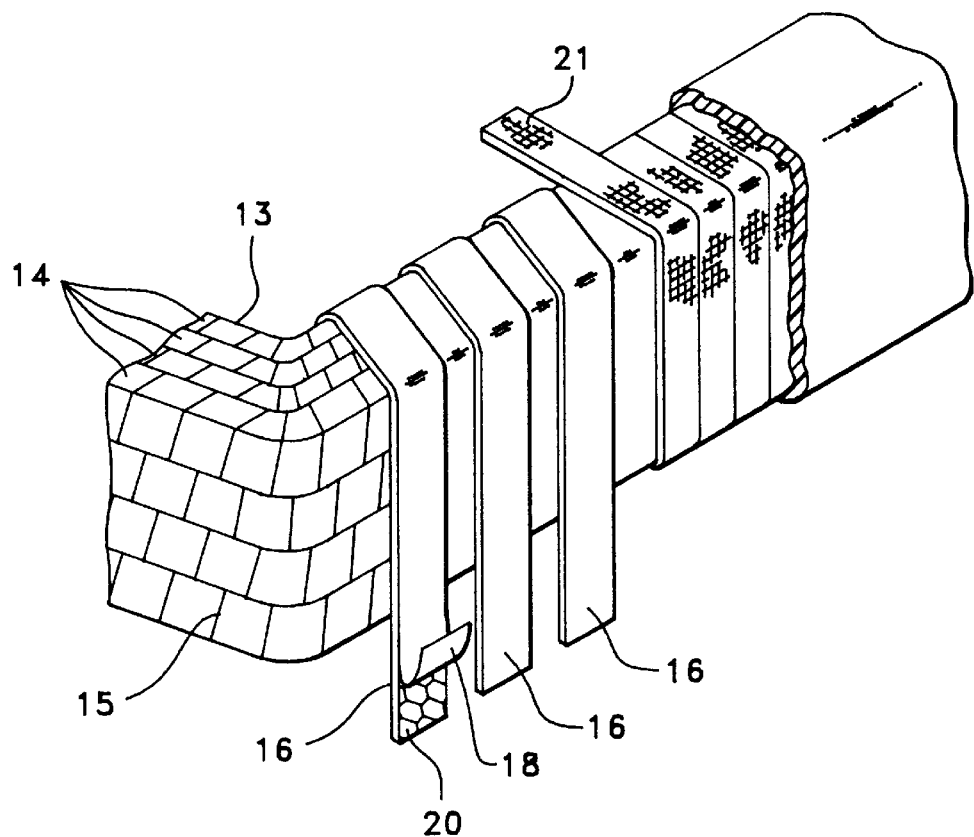
FIG. 1 shows a wrapped, resin-impregnated coil made in accordance with the LCT of the present invention.

The present invention concerns the use of liquid crystal thermoset epoxy resins [LCTs] as electrical insulation. The LCTs have superior electrical and mechanical properties compared to other epoxy resins. The present invention allows for thinner electrical insulation coatings without compromising the electrical performance of the insulated device. The reduced size of the apparatus results in reduced manufacturing costs.

LCTs are comprised of thermosettable polymeric molecules with a terminating epoxy functional group on each of two ends and a relatively linear mesogen between the epoxy functional groups. There are a number of mesogens identified as being components of a LCT molecule, but the list is not exhaustive. The chemical formula of the LCT molecule is shown in Formula I.

Formula I:

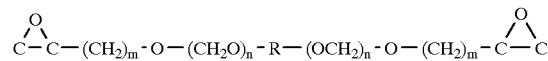

wherein: m is an integer of 1–20;
n is an integer of 0–20; and
R is a mesogen selected from the set consisting of (a)–(p):

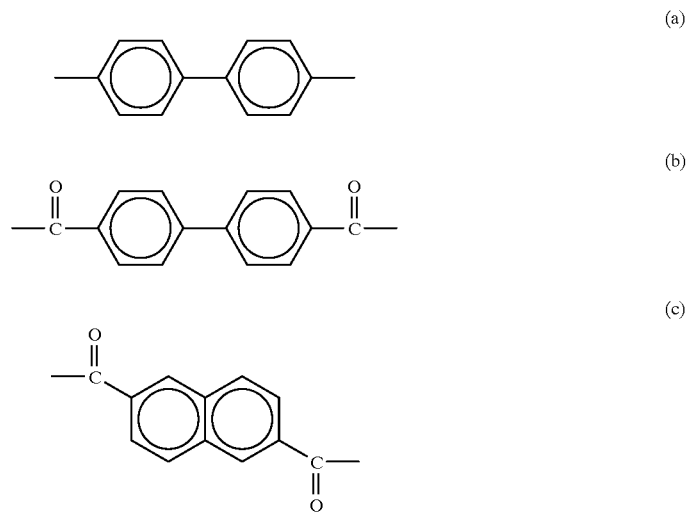

-continued
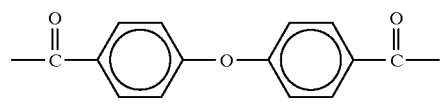
(d)
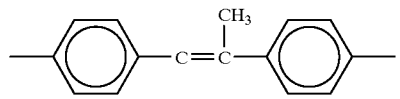
(e)
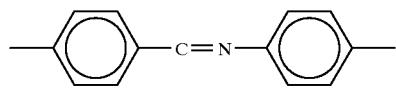
(f)
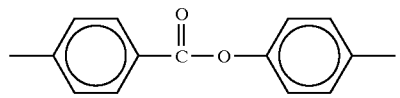
(g)
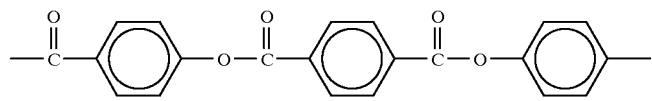
(h)
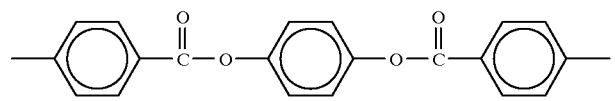
(i)
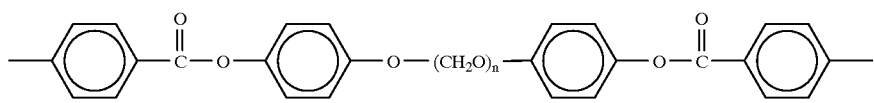
(j)
wherein: n is an integer of 0–20;
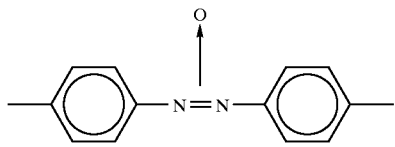
(k)
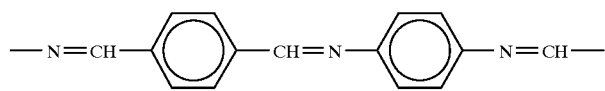
(l)
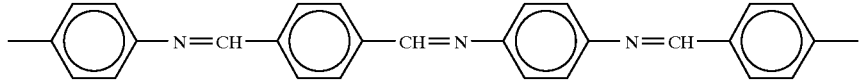
(m)
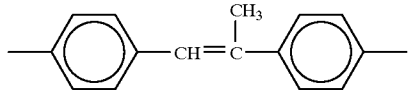
(n)

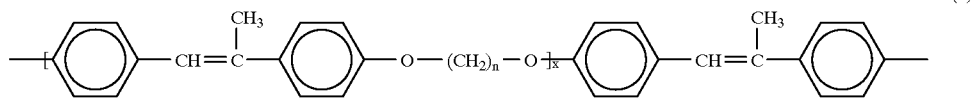

(o)

wherin: n is an integer of 5, 7;
x is an integer of 1–5; and

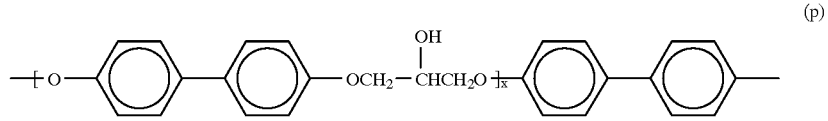

(p)

wherein: x is an integer of 1–4.

The LCT molecule is relatively rigid and linear as a result of the epoxy/mesogen/epoxy combination. When the LCT is curing, the epoxy functional groups crosslink with adjacent molecules. As the molecules are linear, they align with each other, resulting in a hardened, densely-packed, cured LCT material with a relatively high degree of crystallinity compared to conventional epoxy resins, i.e., bisphenol A epoxy resin. In the preferred embodiment of the invention, the LCT is cured with an LCT anhydride curing agent such as 2,4-benzenetricarboxylic anhydride [BTCA] or hexahydrophthalic anhydride [HHPA] and dimethylbenzylamine accelerator although any curing agent may used in the production of the LCT epoxy resins. Other organic, carboxylic acid LCT anhydride curing agents reactive with the LCT, which are to be used in carrying out the invention, include the conventional organic mono- and poly-functional anhydrides. Typical of the mono-functional anhydrides are 1-methylhexahydrophthalic anhydride, tetrahydrophthalic anhydride, 1-methyltetrahydrophthalic anhydride, phthalic anhydride, NADIC anhydride, NADIC methylanhydride, dodecenyl succinic anhydride and the like. Amine-type curing agents, i.e., 4,4-diaminodiphenylsulfone [DDS], are also used as curing agents.

The high crystallinity of the LCTs results in a insulation material with enhanced electrical and mechanical properties for use in high-temperature, high stress applications compared to conventional epoxy resins.

Poly-functional anhydrides which may be employed include pyromellitic dianhydride, polyazelaic polyanhydride, the reaction product of trimellitic anhydride and a glycol, and benzophenone tetracarboxylic acid dianhydride. These organic anhydrides may be used singly or in a mixture. The total anhydride content of the epoxy-anhydride mixture lies within the range of from about 0.5 to about 1.5 anhydride equivalents for each epoxy equivalent. These and other curing agents are well known in the prior art and reference may be made to Epoxy Resins by May and Tanaka.

Other embodiments of the invention comprise LCT combined with epoxy reactive diluents. The epoxy reactive diluents are low viscosity epoxy resins, usually monomers. Examples of the epoxy reactive diluents include diglycidyl ethers of a glycol having from 2 to 12 carbon atoms between the glycidyl ether units, i.e., 2 to 12 carbons in the glycol unit, diglycidyl ether of neopentyl glycol (DGENPG), diglycidyl ethers of 1,4 butane diol, diglycidyl ethers of ethylene glycol, and diglycidyl ethers of polyether glycols, such as, for example, diglycidyl ethers of triethylene glycol and diglycidyl ethers of tetraethylene glycol and their mixtures.

DGENPG is the preferred epoxy reactive diluent. DGENPG is prepared by a two step process. The initial step reacts neopentyl glycol and epicholorohydrin in the presence of $BF_3$ to produce a chlorohydrid intermediate which is then dehydrohalogenated by sodium hydroxide or sodium aluminate to provide:

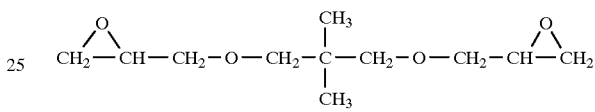

(DGENPG)

The use of diglycidyl ethers of an aliphatic diol as the only epoxy resin component provides resinous compositions having only about 15 cps. to 30 cps. initial viscosities at 25° C. They are extremely useful for very high voltage applications, i.e., about 20,000 to 30,000 volts, where thick multiple layers of mica insulation must be impregnated.

Further embodiments of the invention are modified to lower material costs and improve flexibility and other properties of the LCT. In these embodiments, LCT is combined with materials such as epoxide diluents, flexibilizers, and fillers. Examples of these materials are thixotropic agents, such as $SiO_2$ and asbestos in gel composition, and pigments such as $TiO_2$ which may be used as aids in fluidizing the composition or enhancing the color tones of the cured resins. Various inorganic particulate fillers, such as silica, quartz, beryllium aluminum silicate, lithium aluminum silicate and mixtures thereof, in average particle sizes of from about 10 to 300 microns, may be employed in amounts up to about 100 parts per 100 parts of epoxy resin, to improve electrical properties of the resin formulation.

Referring now to Table I, it is shown that the LCT biphenol epoxy, Formula I using the mesogen (a), cured with DDS has superior thermal properties over bisphenol A epoxy for the purpose of electrical insulation where high temperatures are commonly encountered. Specifically, the LCT has a higher glass transition temperature and a lower coefficient of thermal expansion.

The glass transition temperature is the temperature at which the amorphous domains of a polymer take on the characteristic properties of the glassy state—brittleness, stiffness and rigidity. Thermoset compositions characteristically crosslink and become hard, or "set", when cured for a sufficient period of time. Nevertheless, the mechanical, tensile and electrical properties deteriorate above the glass transition temperature. It is therefore desirable to have a high glass transition temperature in an insulating material.

The lower coefficient of thermal expansion [CTE] also makes the LCT a better insulation material. A high CTE leads to the likelihood of creeping and the creation of voids which may result ultimately in delamination which is deleterious to insulation. The lower CTE enables the LCT to match better with those of lower CTE materials, such as metals, which are typically the materials being insulated. The lower CTE is also advantageous in circumstances where the LCT electrical insulation comprises reinforcing glass fibers or mica tape (discussed below).

TABLE 1

Comparison of Thermal Properties Between Biphenol Epoxy and Bisphenol A Epoxy, Both Cured With Molar Equivalents of 4,4-Diaminodiphenylsulfone

| SAMPLE | Glass transition temperature (° C.) | Coefficient of thermal expansion (ppm/° C.) |
|---|---|---|
| Biphenol Epoxy (LCT) | 231 | 56.9 |
| Bisphenol A Epoxy | 200 | 67.7 |

Referring now to Table II, it is shown that the LCT biphenol epoxy cured using BTCA has better thermal and electrical properties than bisphenol A epoxy. As was the case in Table I, the LCT biphenol epoxy has a higher glass transition temperature than the non-LCT bisphenol A epoxy.

The LCT's electrical properties are also better as it has a higher dielectric strength and lower dissipation factor. The dielectric strength is the ability to withstand voltage. The dissipation factor is the loss in effective resistance. In an insulator, it is favorable to have a higher dielectric strength and a lower dissipation factor. The higher the dielectric strength, the more voltage an insulator will be able to withstand. LCT has a greater ability to withstand higher voltage. This will enable the invention to have 1) thinner insulation to achieve the same insulation characteristics as conventional epoxy resins; and 2) increased voltage of a device insulated with the LCT compared to conventional epoxy resins.

The LCT also has a lower dissipation factor, which is also advantageous in an electrical insulator. An insulator with a lower dissipation factor will be able to maintain its resistance to voltage flow longer. As in the LCT of Table I, the LCT of Table II has an advantageously high glass transition temperature compared to the convention epoxy resin.

TABLE II

Comparison of Thermal and Electrical Properties of Biphenol and Bisphenol A Epoxy, Both Cured with Molar Equivalent 2,4 Benzenetricarboxylic Anhydride

| SAMPLE | Glass transition temperature (° C.) | dielectric strength (kV/10 mil) | Dissipation factor @ 1 MHZ) |
|---|---|---|---|
| Biphenol epoxy (LCT) | 183 | 12.38 | 0.0319 |
| Bisphenol A epoxy | 127 | 10.89 | 0.0372 |

Referring now to Table III, the tensile properties of the LCT dihydroxy phenyl benzoate epoxy (Formula I using the mesogen (g)) is compared to bisphenol A epoxy. The two samples were prepared with different amounts of epoxy and accelerator and also had different curing cycles. They were tested for the mechanical properties of tensile strength, elongation at tear, and E modulus.

The tensile strength of the LCT is just slightly lower than that of the standard epoxy resin. The tensile strength is the stress required to rupture the sample. The lower tensile strength is insignificant, especially when considering the difference in the curing cycles. The LCT was cured at lower temperatures and for less time but still has a comparable tensile strength. It is expected that if exposed to the same curing cycle as the standard epoxy resin, the LCT epoxy resin would exhibit a greater tensile strength as polymers having high degrees of crystallinity or crosslinking typically have higher strengths.

The elongation at tear is much lower for the LCT epoxy resin as the molecular structure is denser than conventional epoxy resins. Low elongation is exhibited by polymers with a high degree of crystallinity or crosslinking. The E modulus from tensile test is also greater for the LCT. The E modulus is the measurement of the resistance to deformation. Again, the LCT is expected to have a higher E modulus since it has a greater degree of crystallinity and crosslinking. The LCT, with its lower elongation at tear and higher E modulus, has superior mechanical properties for an electrical insulation.

LCT epoxy resin cured in the same manner as the standard epoxy resin would be expected to exhibit far greater mechanical properties than the standard epoxy resin. These superior mechanical properties of the LCT make it an excellent electrical insulation material as it is self-reinforcing, improving the overall electrical properties of the electrical insulation by reducing delamination and void formation.

TABLE III

Comparison of Tensile Properties of Dihydroxy Phenyl Benzoate Epoxy and Bisphenol A Epoxy, Cured with Hexahydrophthalic Anhydride and Dimethylbenzylamine Accelerator

| PROPERTY | Dihydroxy Phenol Benzoate Epoxy (LCT) | Bisphenol A Epoxy |
|---|---|---|
| Anhydride Concentration (phr) | 90 | 78 |
| Accelerator Concentration (phr) | 1.9 | 1.0 |
| Cure Cycle | 80° C./4 hrs. plus 120° C./16 hrs. | 90° C./2 hrs. plus 150° C./24 hrs. |
| Tensile Strength (Mpa) | 65 | 76 |
| Elongation at Tear (%) | 3.2 | 6.4 |
| E Modulus From Tensile Test (MPa) | 3070 | 2346 | phr = parts per hundred parts epoxy.

Referring now to the drawings, wherein like reference numerals designate corresponding structures throughout the views, and referring in particular to FIG. 1, there is illustrated a coil 13, comprising a plurality of turns of conductors 14. Each turn of the conductor 14 consists essentially of a copper bar or wire wrapped with a turn insulation 15. The turn insulation 15 is prepared preferably from a fibrous sheet or strip impregnated with a bonding resinous insulation, preferably LCT. The turn insulation 15 may consist solely of a coating of uncured resin, preferably LCT. Fiberglass cloth, paper asbestos cloth or asbestos paper treated with LCT may be used with equally satisfactory results. The bonding resin may be a mixture of any two or more resins, preferably with one of the resins being LCT.

The turn insulation 15 may be not adequate alone to withstand the severe voltage gradients that will be present between the conductor and ground when the coil is installed in a high-voltage generator. Therefore, ground insulation for the coil is provided by wrapping one or more layers of composite mica tape 16 about the turn 14. Such micatape 16 comprises a pliable backing sheet 18 of, for example, poly-ethylene glycol terephthalate mat, having a layer of mica flakes 20 bonded thereto by a resinous binder, preferably LCT. The tape 16 may be applied half lapped, abutted or in any other suitable manner. Generally, multiple layers of the mica tape 16 are wrapped about the coil with sixteen or more layers generally being used for high voltage coils. The number of layers may be decreased depending on the power of the generator and the effectiveness of the electrical insulator. To impart better abrasion resistance and to secure a tighter insulation, a wrapping of an outer tape 21 of a tough fibrous material, for example, glass fiber, asbestos or the like is applied to the coil.

Figure 2:
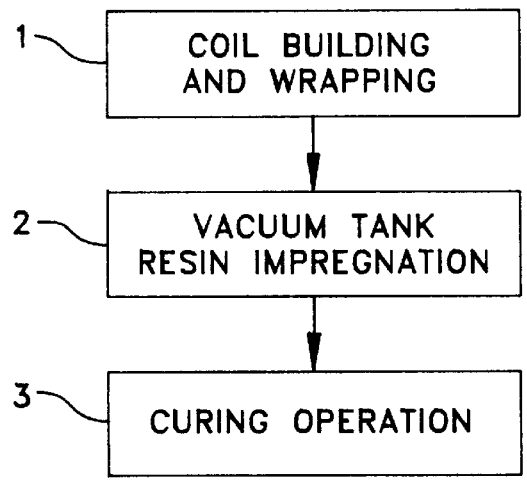
FIG. 2 is a flow sheet of a process for impregnating a coil.

Referring to FIG. 2, there is a schematic illustration of the process steps which may be followed in preparing an insulated high voltage generator coil in accordance with this invention. In Step 1, the coil is built and wrapped in one of the manners as described above.

Next, in Step 2, the coil is sealed in a vacuum impregnating tank and may be subjected to a heat drying and evacuating operation to remove substantially all moisture, air and other undesirable volatile material from the coil. The LCT is then applied to the coil by filling the tank and submerging at least a portion of the coil. While the coil is completely covered with the LCT, atmospheric air, nitrogen, or another gas is introduced into the impregnating tank under pressure to assist the LCT in penetrating the interstices of the coil 13. The impregnating treatment need not be of long duration. Ten minutes under pressure ordinarily is sufficient to completely impregnate and saturate small windings. Larger coils may take up to several hours or more to reach satisfactory impregnation. Other embodiments of the invention include atmospheric pressure immersions and placing the coil in a mold which is then filled with LCT.

In Step 3, the LCT coated coil is subjected to a curing operation. In one embodiment of the invention, the coil is withdrawn from the impregnation tank, drained briefly, and cured. In another embodiment of the invention, the coil is impregnated in a mold and the LCT is cured while the coil in the mold. The curing, either in the mold or out of the impregnation tank, is performed by heating the coil. For example, coils can be placed into an oven or kept in the mold and cured by heating above 85° C. and up to about 135° C.

The invention is not limited to insulated coils. Any electrical conducting device requiring electrical insulation is suitable for use in the invention, such as transformers where they are disposed about a magnetic core. Additionally, while LCT is useful for insulating electrical devices in high-temperature, high-stress environments, the invention is suitable for devices used in other environments. Accordingly, the present invention may be embodied in other specific forms without departing from the spirit or essential attributes thereof and, accordingly, reference should be made to the appended claims, rather than to the foregoing specification, as indicating the scope of the invention.

We claim:

1. High voltage electrical insulation comprising at least one fibrous strip impregnated with a liquid crystal thermoset epoxy resin.

2. The insulation of claim 1 wherein the liquid crystal thermoset epoxy resin has the following Formula I:

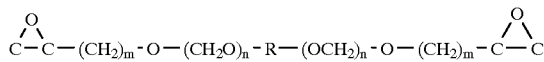

wherein: m is an integer of 1–20;

n is an integer of 0–20; and

R is a mesogen selected from the set consisting of (a)–(p):

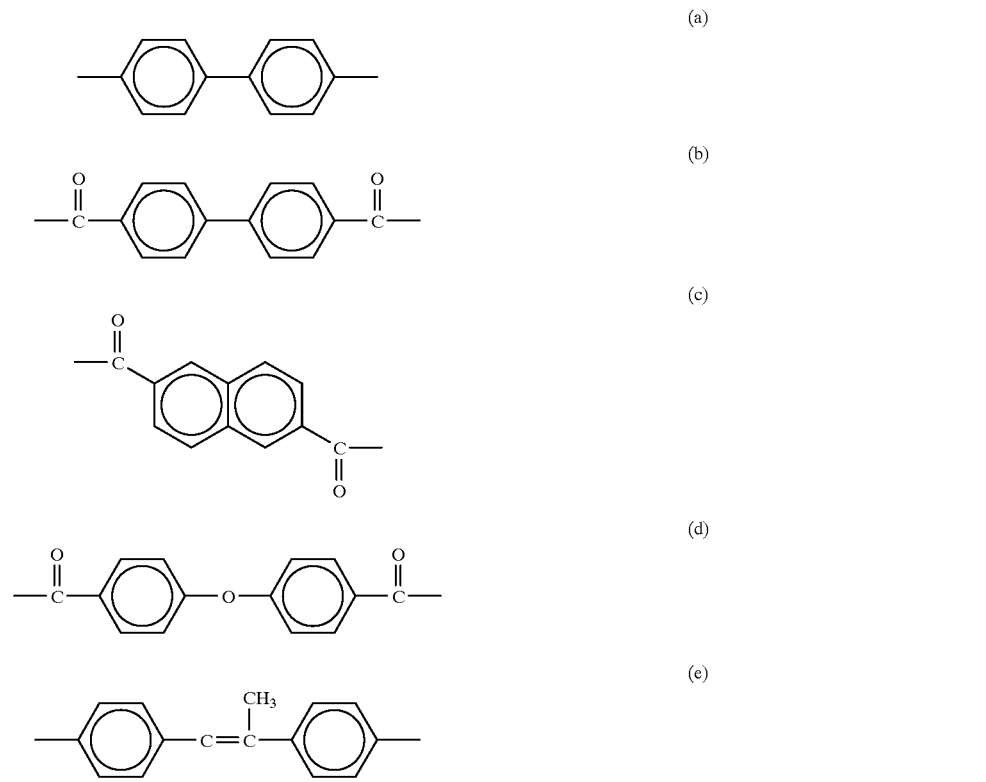

-continued
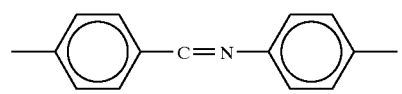
(f)
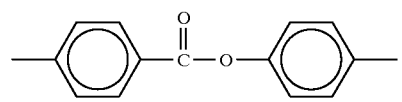
(g)
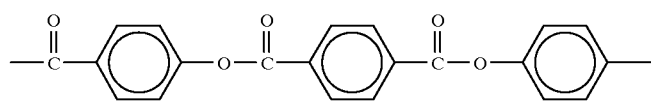
(h)
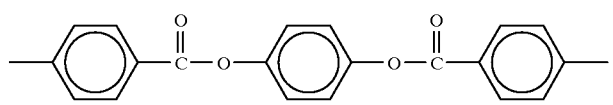
(i)
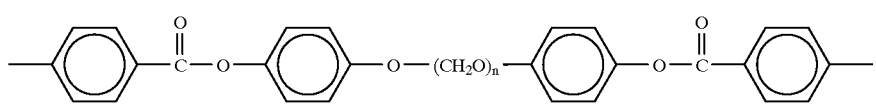
(j)
wherein: n is an integer of 0–20;
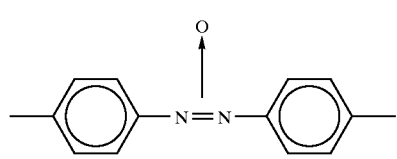
(k)
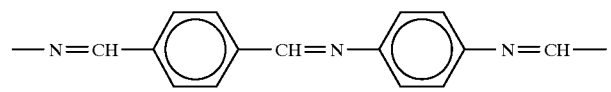
(l)
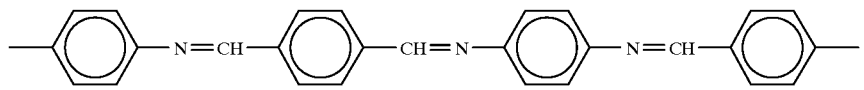
(m)
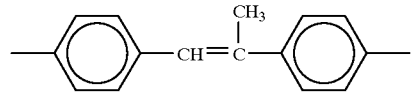
(n)
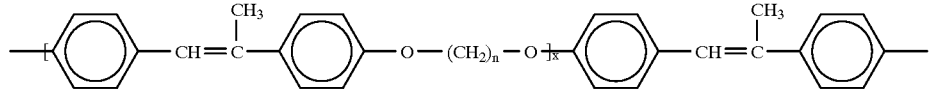
(o)
wherein: n is an integer of 5, 7;
x is an integer of 1–5; and

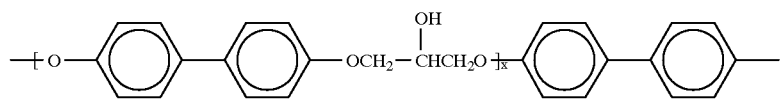
(p)

wherein: x is an integer of 1–4.

3. The insulation of claim 2 wherein the fibrous strip comprises glass fibers or mica tape.

4. The insulation of claim 2 further comprising an epoxy reactive diluent, an epoxide diluent, a flexibilizer, or a filler.

5. The insulation of claim 1, wherein the insulation has a dielectric strength of about 12.38 kV/10 mil.

6. The insulation of claim 5 wherein the insulation has a dissipation factor of about 0.0319 at one MHz.

7. The insulation of claim 1, wherein the insulation has a dielectric strength of about 10.89 kV/10 mil.

8. The insulation of claim 7 wherein the insulation has a dissipation factor of about 0.0372 at one MHz.

* * * * *